(12) United States Patent
LaCrosse et al.

(10) Patent No.: US 10,081,923 B2
(45) Date of Patent: Sep. 25, 2018

(54) SPILL REMOVAL METHOD AND SYSTEM

(71) Applicant: Opflex Technologies, LLC, Indianapolis, IN (US)

(72) Inventors: James LaCrosse, Indianapolis, IN (US); John Baker, Carmel, IN (US)

(73) Assignee: OPFLEX TECHNOLOGIES, LLC, Indianapolis, IN (US)

( * ) Notice: Subject to any disclaimer, the term of this patent is extended or adjusted under 35 U.S.C. 154(b) by 207 days.

(21) Appl. No.: 14/702,241

(22) Filed: May 1, 2015

(65) Prior Publication Data
US 2015/0315760 A1    Nov. 5, 2015

Related U.S. Application Data

(60) Provisional application No. 61/987,600, filed on May 2, 2014.

(51) Int. Cl.
*E02B 15/04*        (2006.01)
*E02B 15/10*        (2006.01)
(Continued)

(52) U.S. Cl.
CPC ........ *E02B 15/101* (2013.01); *B01D 17/0202* (2013.01); *C02F 1/285* (2013.01);
(Continued)

(58) Field of Classification Search
CPC ...... E02B 15/10; E02B 15/101; E02B 15/104; B01D 17/02; B01D 17/0202; C02F 1/40;
(Continued)

(56) References Cited

U.S. PATENT DOCUMENTS 3,679,058 A  *  7/1972  Smith ................... C02F 1/681
                                                    210/242.4
3,702,657 A     11/1972  Cunningham et al.
(Continued)

FOREIGN PATENT DOCUMENTS

DE          10244122 C1    10/2003
JP          S526165 A      1/1977
(Continued)

OTHER PUBLICATIONS

Curtis, Synthetic Eelgrass: Floating Sorbent Containment Boom, Jan. 3, 2013, pp. 1-12.
(Continued)

*Primary Examiner* — Pamela H Weiss
(74) *Attorney, Agent, or Firm* — Bose McKinney & Evans LLP

(57) ABSTRACT

A method for removing oil from a body of water including providing a matrix having a longitudinally-directed column defined by oil-absorbing and/or oil-adsorbing blankets each affixed independently of each other to a connecting strip that extends along the length of the column; deploying the matrix to a body of water to bring the column into contact with the body of water; inducing tension in the connecting strip to move blankets of the column in unison relative to the body of water; collecting oil with the first and second blankets; and removing the blankets and at least a portion of the oil collected thereby. Also, an oil spill removal system including such a matrix and in which, during matrix movement in the longitudinal direction, drag on a following blanket of a matrix column is carried by the connecting strip rather than by a preceding blanket of that column.

9 Claims, 15 Drawing Sheets

(51) Int. Cl.
*B01D 17/02* (2006.01)
*C02F 1/28* (2006.01)
*C02F 1/68* (2006.01)
*C02F 1/40* (2006.01)
*C02F 101/32* (2006.01)

(52) U.S. Cl.
CPC .............. *C02F 1/40* (2013.01); *C02F 1/681* (2013.01); *C02F 2101/32* (2013.01); *E02B 15/104* (2013.01); *Y02A 20/204* (2018.01)

(58) Field of Classification Search
CPC ...... C02F 1/285; C02F 1/681; C02F 2101/32; Y02A 20/204
See application file for complete search history.

(56) References Cited

U.S. PATENT DOCUMENTS

| | | | |
|---|---|---|---|
| 4,061,569 A * | 12/1977 | Bennett | E02B 15/104 |
| | | | 210/671 |
| 4,356,089 A * | 10/1982 | Challener | C02F 1/681 |
| | | | 210/242.4 |
| 4,377,478 A * | 3/1983 | Rolls | E02B 15/101 |
| | | | 210/242.3 |
| 4,419,236 A | 12/1983 | Hsu | |
| 4,439,324 A | 3/1984 | Crotti | |
| 4,832,852 A | 5/1989 | Wells et al. | |
| 4,919,820 A | 4/1990 | Lafay et al. | |
| 5,181,802 A | 1/1993 | Thengs et al. | |
| 5,229,006 A | 7/1993 | Brinkley | |
| 5,588,785 A | 12/1996 | Holland | |
| 5,688,075 A * | 11/1997 | Gradek | E02B 15/06 |
| | | | 210/242.3 |
| 5,834,385 A * | 11/1998 | Blaney | B01J 20/28023 |
| | | | 442/382 |
| 5,863,440 A * | 1/1999 | Rink | B01D 17/0205 |
| | | | 210/502.1 |
| 5,885,451 A * | 3/1999 | Porrovecchio, Sr. | |
| | | | B01D 17/0202 |
| | | | 210/242.4 |
| 6,344,519 B1 * | 2/2002 | Rink | B01D 17/0202 |
| | | | 210/924 |
| 7,399,411 B2 | 7/2008 | DeAngelis | |
| 8,348,549 B2 * | 1/2013 | Stiles | E02B 15/06 |
| | | | 405/60 |
| 8,557,121 B1 | 10/2013 | Mendes | |
| 8,721,220 B2 | 5/2014 | Fore | |
| 8,853,289 B2 | 10/2014 | Smith et al. | |
| 8,968,570 B2 | 3/2015 | Riedel | |
| 2003/0222025 A1 | 12/2003 | Archuleta | |
| 2005/0023225 A1 * | 2/2005 | Kumpf | A01K 73/12 |
| | | | 210/747.6 |
| 2011/0287929 A1 | 11/2011 | Smith et al. | |
| 2011/0303613 A1 * | 12/2011 | Crouse | E02B 15/046 |
| | | | 210/703 |
| 2011/0306491 A1 * | 12/2011 | Belisle | B01J 20/22 |
| | | | 502/402 |
| 2012/0009017 A1 | 1/2012 | Martines | |
| 2013/0240451 A1 * | 9/2013 | Curtis, Jr. | B01D 17/0202 |
| | | | 210/675 |
| 2014/0124427 A1 * | 5/2014 | Riedel | B01J 20/28038 |
| | | | 210/232 |
| 2015/0122718 A1 * | 5/2015 | Riedel | E02B 15/06 |
| | | | 210/242.3 |

FOREIGN PATENT DOCUMENTS

| | | |
|---|---|---|
| JP | 2005139736 A | 6/2005 |
| JP | 2013092030 A | 5/2013 |
| WO | WO 97/07291 | 2/1997 |
| WO | WO 00/53851 | 9/2000 |
| WO | WO 2011139475 A1 * | 11/2011 ........... E02B 15/041 |

OTHER PUBLICATIONS

Schmit, After BP Oil Spill, Thousands of Ideas Poured in for Cleanup, USA Today, Nov. 15, 2010, pp. 1-4, http://usatoday30.usatoday.com/money/industries/environment/2010-11-15-gulfcleanup15_CV_N.htm.

Williams and Curtis, Oil Scavenging with Ethylene Methyl Acrylate, pp. 1-5.

International Search Report and Written Opinion; PCT/US2015/028913; dated Jul. 23, 2015; 16 pages.

Extended European Search Report, EP 15 785 283.1 dated Feb. 22. 2018, 9 pages.

* cited by examiner

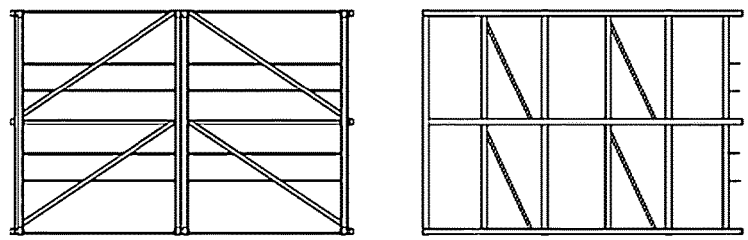
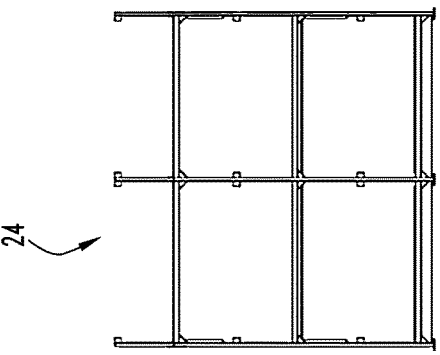
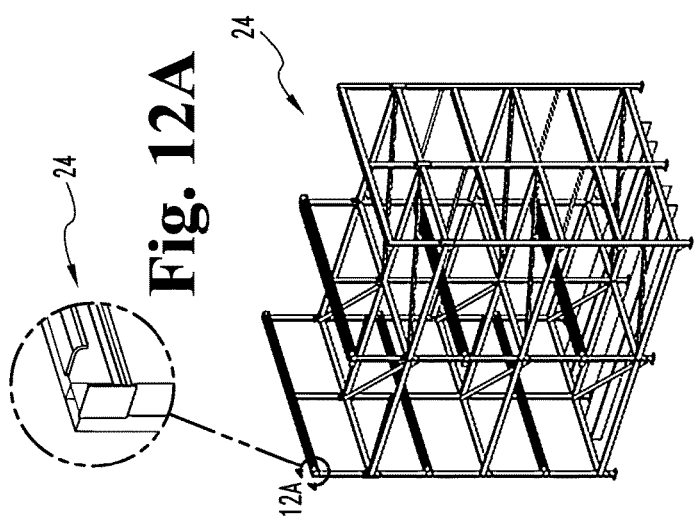

SPILL REMOVAL METHOD AND SYSTEM

PRIORITY CLAIM AND CROSS-REFERENCE TO RELATED APPLICATION(S)

This application claims the benefit under Title 35, U.S.C. § 119(e) of U.S. Provisional Patent Application Ser. No. 61/987,600 entitled SPILL REMOVAL METHOD AND SYSTEM filed on May 2, 2014, and is related to PCT International Patent Application No. PCT/US15/27109 entitled REMEDIATION PAD STRUCTURE filed on Apr. 22, 2015, the entire disclosures of which are hereby incorporated herein by reference.

BACKGROUND

The present disclosure relates to methods and systems for removing liquid hydrocarbon compounds, such as but not limited to oil, fuels, lubricants, liquid hydrocarbons, or crude oil (collectively referred to herein as "oil"), for example, from bodies of water. A body of water may be fresh water or salt water, such as an ocean, bay, harbor, river, inland lake, or the like, and has a surface portion or area. The body of water exists adjacent a land area, and they meet and adjoin one another at a bank, beach, or the like. The present disclosure also relates to methods and systems for recovering (i.e., reclaiming) the removed oil.

The need for removal of oil leakages, slicks, and spills (collectively referred to herein as "spills") from bodies of water and, to a lesser degree, for recovery of the removed oil, is well known. Oils spills are often due to releases from tankers, barges, or from offshore drilling operations, and may occur in rivers in addition to oceans, seas, gulfs, and lakes. Oil may be present on and under the surface of a body of water and on any land that the water touches, and damages and kills aquatic and terrestrial life, affects food sources obtained from those waters, and ruins neighboring beaches. Areas affected by oil spills are economically affected due to the inability to practice livelihoods dependent upon the waters and beaches such as fishing, shrimping, and tourism.

Although cleaning up oil spills from the surface of the water and below the surface of the water is a challenging and costly procedure, the problem of cleaning up oil spills from the surface of the water is a concern not only from an economic aspect but also because of the resulting marine biological impact of such spills. It is also known that layers of oil upon bodies of water resulting from the accidental or purposeful discharge of oils into a body of water produce a surface film that may be combustible and endangers the area.

Furthermore, one of the problems encountered subsequent to removal of oil from the surface of water, is the physical disposal of the large volumes of oil involved. Preferably, it is recovered for a useful purpose rather than to be disposed of in a landfill.

A typical proposed solution in dealing with the problem of a spill on a body of water is providing means to partially or completely surround the area of oil accumulation on the water with floating barriers or booms and then to pump the accumulated oil to a desirable storage area or burn it off. Recovery of or burning off the oil are challenging due to the fact that oil spills usually cover a large area and the water may be moving.

Another typically proposed solution is to place oil absorbing materials on or below the surface of the water in contact with the spill to collect the oil.

Once oil at or below the surface of water is removed, there remains the problem of how to dispose of the oil and/or the media used to remove the oil from the water. Typically, these oil-coated materials are waste products.

Another challenge to removal and/or recovery of the oil has been that many of the traditionally used materials such as, for example, straw, vermiculite, or sawdust, also absorb a large amount of water, which decreases the amount of oil that those materials can absorb. The development of hydrophobic and oleophilic media has been helpful in this regard, and such materials are now commonly in use for selective removal of oil from water. One such material is oleophilic polypropylene. Such media is known by those having ordinary skill in the relevant art as a white sorbent, and is commonly produced in pad form, typically rectangular 12×16 inches in area and approximately ¼ inch thick, and often referred to as white board or white pad. Although this oil removal media has obvious advantages, a big drawback relates to the recovery of removed oil and/or the ultimate disposition of the media. When coated with oil this media is essentially a waste product, and although some amount of oil collected thereon may be recovered by scraping the oil off its surfaces, most of the oil remains absorbed therein and cannot be mechanically extracted therefrom. Regardless of whether some amount of collected oil is recovered from it, the used white sorbent media is disposed of rather than reused.

Selective removal of oil spills floating on surfaces of bodies of water may also entail use of hydrophobic and oleophilic open-celled foams having capacity for removing oil primarily by absorption. Such a foam is disclosed in U.S. Pat. No. 3,819,514, the entire disclosure of which is hereby incorporated herein by reference. These oil absorbent materials may also be oil adsorbent, and the oil stays in the media due to polarity. An absorbent allows a substance to enter it, i.e., it takes in another substance; whereas with an adsorbent, the substance is adhered to the surface of the adsorbent. Recovery of the removed oil may be done by squeezing these foams, and the foam may be reused a limited number of times for oil removal and recovery before ultimately being disposed of. Preferably, the foam is biodegradable so that it will degrade when eventually placed in a landfill. Selective removal of oil spills floating on surfaces of bodies of water may also be accomplished through use of improved open-cell foam media in the form of pads that absorb the oil, such as OPFLEX™ media commercially available from Opflex Technologies, LLC and described in Patent Publication No. US 2011/0287929 A1, the entire disclosure of which is hereby incorporated herein by reference. OPFLEX™ media adsorbs and absorbs oil, repels water, and is reusable five to more than ten times, which also reduces transportation costs relative to white sorbent media, which is not reusable. Despite its relatively higher initial cost, the ability to reuse OPFLEX™ can result in material cost parity with white board. Notably, 90 percent of the oil collected by OPFLEX™ media can be recovered through a wringer or centrifuge process. Moreover, OPFLEX™ media absorbs twice as much oil per square foot as comparably thick white board, and is biodegradable whereas the white sorbents are not. Studies have been performed which demonstrate that the use of OPFLEX™ results in 90 percent less oil-collecting media and 90 percent less oil being sent to a landfill, compared to white sorbents. Further, the substantially increased ability to recover oil from a spill using OPFLEX™ media, vis-à-vis white board, is expected to more than offset any relatively higher costs associated with labor and/or material.

In a preliminary comparative test relating to North Dakota Bakken Crude, ¼ gallon (i.e., approximately 946 ml) of the oil was poured into each of two separate tanks of water, and respectively collected by identically sized pads of OPFLEX™ media and white board. The collected oil was recovered by using a wringer from both media types. One and a half OPFLEX™ pads recovered 650 ml of the oil, whereas three white board pads recovered 110 ml. The one and a half OPFLEX™ pads were redeployed in a tank containing an additional ¼ gallon of Bakken Crude to recover an additional 175 ml of the oil, for a total recovery of 825 ml after one redeployment.

Further preliminary Bakken Crude tests and economic analysis yielded the net cost comparison associated with a 100,000 gallon spill cleanup shown in TABLE 1:

TABLE 1

Economic Analysis/Comparison:
Net Cost to Clean up 100,000-Gallons Oil Spill
Bakken Crude

| | Product | |
|---|---|---|
| Category | White Board | OPFLEX |
| Avg Adsorption (gal/100 sq-ft) 1$^{st}$ Use | 6.27 | 12.50 |
| Avg Adsorption (gal/100 sq-ft) 2$^{nd}$-5$^{th}$ Use | 0.00 | 12.50 |
| Performance Removal (pads/gallon) | 12 | 6 |
| Number of Uses per Pad | 1 (once) | 5 cycles through wringer |
| Total Pads Required | 1.2 million | 120,000 |
| Price per Pad (15 × 17) | $  .30 | $3.00 |
| Total Cost for Pads | $360,000 | $360,000 |
| Recovery of Oil - Gallons | None/Limited | 90,000 |
| Recovery of Oil - Barrels | None/Limited | 2,150 |
| Credit Oil Recovered ($100 per bbl) | 0 | ($215,000) |
| Net Cost (Pads Cost plus Credit) | $300,000 | $145,000 |

Note:
Additional research required

In a similar preliminary test relating to Alberta Oil Sands, ½ gallon of the oil was poured into each of two separate tanks of water, and respectively collected by identically sized pads of OPFLEX™ media and white board, with the collected oil recovered from both media types by using a wringer. On their initial deployment, 3¼ OPFLEX™ pads recovered 775 ml of oil, whereas five white pads recovered 350 ml. Three used OPFLEX™ pads were redeployed in a tank containing an additional ¼ gallon of Alberta Oil Sands to recover an additional 50 ml of the oil, for a total recovery of 825 ml after one redeployment.

Further preliminary Oil Sands tests and economic analysis yielded the net cost comparison associated with a 100,000 gallon spill cleanup shown in TABLE 2:

TABLE 2

Economic Analysis/Comparison:
Net Cost to Clean up 100,000-Gallons Oil Spill
Canadian Oil Sands

| | Product | |
|---|---|---|
| Category | White Board | OPFLEX |
| Avg Adsorption (gal/100 sq-ft) 1$^{st}$ Use | 7.50 | 11.60 |
| Avg Adsorption (gal/100 sq-ft) 2$^{nd}$-8$^{th}$ Use | 0.00 | 5.80 |
| Performance Removal (pads/gallon) | 10 | 6.5 |

TABLE 2-continued

Economic Analysis/Comparison:
Net Cost to Clean up 100,000-Gallons Oil Spill
Canadian Oil Sands

| | Product | |
|---|---|---|
| Category | White Board | OPFLEX |
| Number of Uses per Pad | 1 (once) | 8 cycles through wringer |
| Total Pads Required | 1.0 million | 130,000 |
| Price per Pad (15 × 17) | $  .30 | $3.00 |
| Total Cost for Pads | $300,000 | $390,000 |
| Recovery of Oil - Gallons | None/Limited | 90,000 |
| Recovery of Oil - Barrels | None/Limited | 2,150 |
| Credit Oil recovered ($100 per bbl) | 0 | ($215,000) |
| Net Cost (Pads Cost plus Credit) | $300,000 | $175,000 |

Note:
Additional research required

From the above test results, OPFLEX™ media clearly provides advantages over white sorbent media. At present, however, pads of either media type are typically deployed in a manner that entails manually, and rather slowly, placing or removing the rather small pads. Given that a 2000 oil gallon spill on a body of water can cover a surface area approximately equal to that of six football fields (i.e., about 360,000 square feet), removing such a spill in the above-described manner, regardless of media type used, can be very labor intensive and slow.

In view of the large sizes of many spills, a system and method for quickly deploying the media over a widespread area, and for optionally recovering the oil collected by the media, would represent a significant advancement in the relevant art.

SUMMARY

The present disclosure provides an improved system and/or method for removing oil from the surface of a body of water that facilitates quick deployment over a widespread area.

The present disclosure also provides an improved system and/or method for recovering the oil removed from the body of water, and which facilitates a reduction in the amount of oil-collecting media and oil that would otherwise be sent to a landfill, as well as use of oil removed from the spill.

Moreover, an oil spill removal system according to the present disclosure includes a one or two-dimensional matrix of oil-absorbing and/or oil-adsorbing blankets. The matrix includes at least one longitudinally-directed column defined blankets each affixed independently of each other to at least one connecting strip that extends along the length of the column. During matrix movement in the longitudinal direction, drag on a following blanket of the matrix column is carried by the connecting strip rather than by a preceding blanket of the column. Consequently, stresses on the preceding blanket due to that drag are avoided, thereby beneficially reducing the risk of its damage and possibly prolonging its service life.

The present disclosure provides a method for removing oil from a body of water, including the steps of: providing a plurality of oil-absorbing and/or oil-adsorbing blankets defining a longitudinally-directed column of a matrix of oil-absorbing and/or oil-adsorbing blankets affixed independently of each other to at least one elongate connecting strip extending along the length of the column; deploying the matrix to a body of water to bring the column into contact with the body of water; inducing tension in the connecting strip to move first and second blankets of the column in unison substantially in the column longitudinal direction relative to the body of water; collecting oil contained in the body of water with the first and second blankets; and removing the first and second blankets and at least a portion of the oil collected thereby from the body of water, whereby oil is removed from the body of water.

A further aspect of the method is that it includes a step of recovering from the first and second blankets oil removed from the body of water.

An additional aspect of the method is that it also includes a step of bringing the first and second blankets into contact with the body of water subsequent to the step of recovering.

A further aspect of the method is that the step of deploying includes dispensing the column longitudinally from a rack supporting the plurality of blankets by applying tension to the connecting strip.

An additional aspect of the method is that the dispensing includes unrolling the column from about an axis supported by the rack.

A further aspect of the method is that the matrix is a one-dimensional matrix including only one column.

A further aspect of the method is that the step of providing includes providing a laterally-distributed plurality of columns that define a two-dimensional matrix, and each respective one of the plurality of laterally-distributed columns of the matrix is utilized in performing the steps of deploying, inducing, collecting, and removing.

A further aspect of the method is that it includes steps of: moving the matrix relative to the body of water with a boat, and maneuvering the matrix through the body of water to bring the matrix into contact with an oil spill located on the body of water. The step of collecting includes collecting oil from the oil spill with the first and second blankets.

An additional aspect of the method is that the step of moving includes towing the matrix in a substantially longitudinal direction with a towboat.

Furthermore, an aspect of the method is that the step of maneuvering includes utilizing an adjustable rudder and/or a sea anchor to control movement of the matrix relative to the body of water and the towboat.

An additional aspect of the method is that the matrix is in the form of a continuously moveable endless belt carried by a skimmer boat.

The present disclosure also provides a system for removing oil from a body of water, including a matrix of oil-absorbing and/or oil-adsorbing blankets. The matrix includes a plurality of oil-absorbing and/or oil-adsorbing blankets defining a longitudinally-directed matrix column, and at least one elongate connecting strip extending along the length of the column. Each of the plurality of blankets is affixed independently of each other to the connecting strip. The inducement of tension in the connecting strip is capable of moving first and second blankets of the plurality of blankets in unison in a direction of travel generally parallel with the column longitudinal direction. The first blanket follows a second blanket in the direction of travel, and resistance to movement of the first blanket in the direction of travel is substantially carried by the connecting strip and is not substantially imparted to the second blanket.

A further aspect of the system is its inclusion of an oil recovery portion receivable of the matrix column. Oil collected by the plurality of blankets for removal from a body of water is recoverable from the plurality of blankets by the oil recovery portion.

An additional aspect of the system is that the plurality of blankets is subjected to compression by the oil recovery portion, whereby oil collected by the plurality of blankets for removal from the body of water is squeezable from the blankets.

A further aspect of the system is that the matrix is a one-dimensional matrix including only one said column.

A further aspect of the system is that the matrix is a two-dimensional matrix including a laterally-distributed plurality of columns.

An additional aspect of the system is that the blankets of each column of the matrix have longitudinally aligned lateral edges, and the respective lateral edges of a pair of laterally adjacent columns of the matrix are spaced from each other by a lateral gap.

A further aspect of the system is its inclusion of a laterally extending pull pole and a laterally extending spool pole. The column extends longitudinally between the pull pole and the spool pole, and pull pole and the spool pole are interconnected through the connecting strip.

An additional aspect of the system is its inclusion of an adjustable rudder attached to a spool pole. Movement of the matrix relative to a body of water is controllable by adjustments of the rudder.

An additional aspect of the system is its inclusion of a sea anchor attached to a spool pole, and the matrix is capable of being stabilized on a body of water by the sea anchor.

A further aspect of the system is its inclusion of a plurality of connecting strips. Each of the plurality of connecting strips is affixed to the plurality of blankets defining the column, with at least two of the plurality of connecting strips laterally spaced from each other.

An additional aspect of the system is that the plurality of connecting strips includes a pair of connecting strips in superposition with each other and between which the thickness of each of the plurality of blankets defining the column is disposed.

Furthermore, an aspect of the system is that the superposed connecting strips are attached to each other through the thickness of each of the plurality of blankets defining the column.

A further aspect of the system is that longitudinally adjacent blankets of the column are spaced from each other by a longitudinal gap, the connecting strip extending over the longitudinal gap.

A further aspect of the system is its inclusion of a towboat adapted to pull the matrix generally along the direction of travel through a body of water.

A further aspect of the system is that the matrix is configured as an endless belt, and that the system also includes a skimmer boat adapted to carry the matrix. The matrix is movable along the direction of travel relative to the skimmer boat and a body of water.

A further aspect of the system is its inclusion of a rack on which at least one column is storable in a spirally wound roll configuration, and from which the column is dispensable during deployment of the matrix for the removal of oil from a body of water.

An additional aspect of the system is its inclusion of a conveyance on which the rack is disposed, the conveyance adapted to be located at a deployment site.

BRIEF DESCRIPTION OF THE DRAWINGS

The above-mentioned aspects and other characteristics and advantages of a method or system according to the present disclosure will become more apparent and will be better understood by reference to the following description of exemplary embodiments taken in conjunction with the accompanying drawings, wherein:

FIG. 12 is a perspective view of another embodiment of a rack on which rolled pluralities of oil-absorbing blankets may be stored, and from which the blankets may be dispensed during deployment of a system according to the present disclosure;

FIG. 12A is an enlarged view of encircled area 12A of FIG. 12;

FIG. 13 is a front view of the rack of FIG. 12;

FIG. 14 is a side view of the rack of FIG. 12;

FIG. 15 is a plan view of the rack of FIG. 12;

Figure 1:
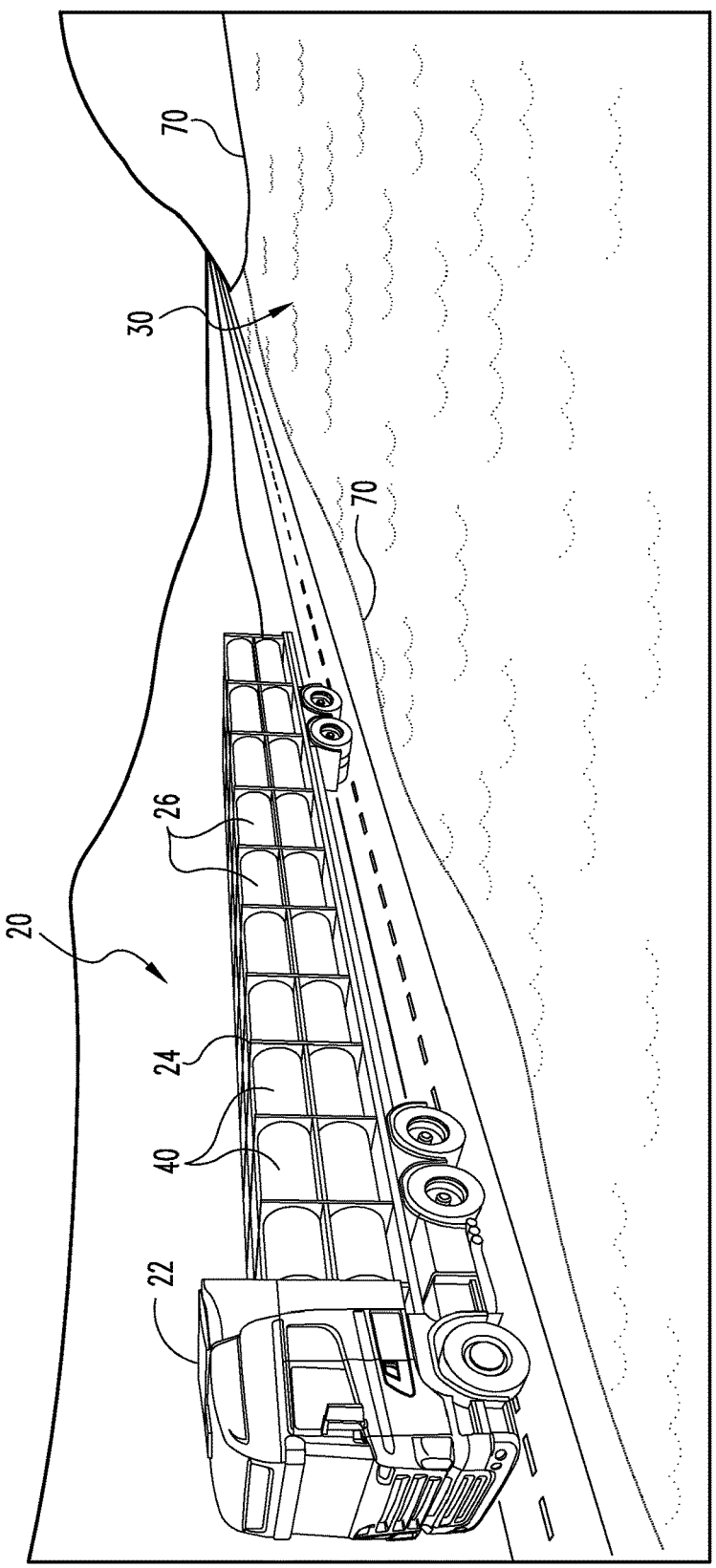
FIG. 1 is a perspective view of an embodiment of a system according to the present disclosure disposed at an example site at which it will be deployed.

Corresponding reference characters indicate corresponding parts throughout the several views. Although the drawings represent embodiments of the disclosed method and system, the drawings are not necessarily to scale or to the same scale and certain features may be exaggerated or omitted in order to better illustrate and explain the present disclosure. Moreover, in accompanying drawings that show sectional views, cross-hatching of various sectional elements may have been omitted for clarity. It is to be understood that this omission of cross-hatching is for the purpose of clarity in illustration only.

DETAILED DESCRIPTION OF EXEMPLARY EMBODIMENT(S)

The embodiments described below are not intended to be exhaustive or to limit the invention to the precise forms or steps disclosed in the following detailed description, but have been chosen and are herein described so that others skilled in the art may appreciate and understand principles and practices according to the present disclosure. It is, therefore, to be understood that the invention herein described is not limited in its application to the details of construction and the arrangement of components set forth in the following description or illustrated in the following drawings, and is capable of having other embodiments and of being practiced or of being carried out in various ways.

Further, it is to be understood that the phraseology and terminology used herein has been adopted for the purpose of description and should not be regarded as limiting. For example, if used, the terms "including," "comprising," or "having," and variations thereof are meant to encompass the items listed thereafter and equivalents thereof as well as additional items. Unless specified or limited otherwise, if used, the terms "mounted," "connected," "supported," and "coupled," and variations thereof are used broadly and encompass both direct and indirect mountings, connections, supports, and couplings. Moreover, if used, the terms "connected" and "coupled," and variations thereof are not restricted to physical or mechanical connections or couplings. The term "and/or" is meant to encompass one or both of the items between which the term is located.

FIG. 1 shows one embodiment of a spill removal system 20 according to the present disclosure including a conveyance 22, depicted as a tractor-trailer, carrying at least one rack 24 on which is disposed rolled pluralities of oil-absorbing and/or oil-adsorbing blankets 26. These oil-collecting blankets 26 may be of any type suitable for collecting oil 28 from a body of water 30, such as the white board or OPFLEX™ media described above. The blankets 26 may also be referred to as pads, though they are preferably substantially larger in area than the above-described pads typically utilized in prior oil-collecting methods and systems. In the disclosed embodiment, each blanket 26 is rectangular, and planar in its natural state, i.e., when unrolled and laid out. Each blanket 26 is approximately four feet wide by six feet long by one-quarter inch thick, although it is to be understood that the length, width, and thickness dimensions, as well as the overall shape, of the media utilized in accordance with the present disclosure may vary.

It is to be understood that the conveyance 22 need not be a land-based vehicle as shown in FIG. 1. It may instead be, for example, a barge, ship, or another suitable vehicle useful for transporting the oil-collecting blankets 26 to a location near the site of the spill 32. It is to also be understood that the conveyance 22 itself may be an optional part of a system 20 according to the present disclosure; indeed, it may be desirable to position the blanket-holding rack(s) 24 at a fixed location where the possibility of a spill 32 is relatively high (e.g., on an offshore drilling rig).

As deployed, a system 20 according to the present disclosure defines a matrix 34 of interconnected, substantially horizontally disposed oil-collecting blankets 26, with the individual blankets 26 disposed in at least one column 36, and a plurality of rows 38. Herein, regardless of whether the blankets 26 are in their natural state, a longitudinal direction is generally parallel to the length of a matrix column 36, and a lateral direction is generally perpendicular to a longitudinal direction and generally parallel to a blanket surface. According to the present disclosure, each roll 40 of blankets 26 defines a column 36 of the matrix 34. The matrix 34 may include only one column 36, forming a one-dimensional matrix of blankets 26. Alternatively, as in the depicted embodiment, the blankets 26 of different ones of a plurality of columns 36 may, particularly if like-sized, define rows 38 of the matrix 34, and form a two-dimensional matrix of blankets 26. It is also envisioned that system 20 may include vertically stacked one-dimensional or two-dimensional matrices 34 of blankets 26 whereby one substantially horizontal layer of interconnected blankets 26 of a one-dimensional or two-dimensional matrix 34 lies above or beneath another one-dimensional or two-dimensional matrix 34.

The rectangular blankets 26 of each generally cylindrical roll 40 are arranged in series and interconnected to each other by at least one flat, elongate flexible connecting member or connecting strip 42 that extends the length of the column 36. In the depicted embodiment, each ribbon-like connecting strip 42 is approximately one inch wide and located laterally inboard approximately four to five inches from the longitudinally aligned lateral edges 44 of the blankets 26 of a matrix column 36. The elongate connecting strips 42 extend longitudinally along the length of the roll 40 of blankets 26. In one embodiment, the connecting strips 42 are polypropylene and provided on one of its two opposing flat sides 46, 48, and are affixed to the blanket surface(s) 50, 52 with a bonding agent or cement; in such an embodiment the connecting strips 42 thus have a construction similar to adhesive tape. Alternatively, the connecting strips 42 may be sewn or otherwise affixed mechanically to the blankets 26. The length of each connecting strip 42 preferably extends continuously from the leading edge 54 of a first-dispensed blanket 56 in the roll 40 to the trailing edge 58 of the last-dispensed blanket 60 in the roll 40. Moreover, the connecting strips 42 may be affixed to opposite sides 50, 52 of the blankets 26, such that the plurality of longitudinally aligned blankets 26 of each matrix column 36 or roll 40 is disposed between two pairs 62, 64 of connecting strips 42, with each pair 62, 64 coextending along opposite sides 50, 52 of the blankets 26 at a common distance from one of the two laterally opposite blanket edges 44. Connecting strips 42 of each pair 62, 64 may be sewn to each other through the blanket thickness.

The matrix 34 of blankets 26 is dispensed from the its respective roll(s) 40 longitudinally and, when system 20 is deployed, has a direction of travel 66 that generally coincides with a length direction(s) of its column(s) 36. The matrix 34 is pulled with a force applied to or through the connecting strips 42, and those of ordinary skill in the relevant art will recognize that the connecting strips 42 of each column 36 carry the load associated with pulling that column's plurality of blankets 26 in its longitudinal direction of travel 66. Thus, resistance to movement of the column 36 in the direction of direction of travel 66, or drag, attributed to a pulled, relatively following or aft-located blanket 26 of a column 36 or roll 40 is not imparted to a relatively leading or fore-located blanket 26 of that column 36 that is itself being pulled, as pulling forces applied to both blankets as they move in unison are carried by the tensioned connecting strips 42. In other words, in the direction of travel 66 the drag on a following, aft-located blanket 26, such as may be induced by that blanket's resistance to movement through the body of water 30 or during deployment from its roll 40, is not carried by a preceding, fore-located blanket 26 but rather by the connecting strips 42. Consequently, stresses on the preceding blanket 26 due to that drag are avoided, thereby beneficially reducing the risk of its damage, e.g., by being torn, and possibly prolonging its service life.

The number of blankets 26 in each column 36 or roll 40 may vary depending on the site 68 at which the system 20 is deployed, or circumstances relating to other components of the system 20 which may limit the number of blankets 26 that can be accommodated in performing the method. For example, the spill 32 at the deployment site 68 may be relatively small, accommodating or necessitating fewer rather than more blankets 26; or the deployment site 68 itself may be of a small size (e.g., a stream, small river, or other such waterway, or small inland lake) which cannot accommodate a large number of blankets 26 to be dispensed from a roll 40 when the system 20 is deployed from its bank or shore 70; or the available towboat 72 (described further below) may be of insufficient power to efficiently pull a large number of blankets 26 through the water. In one embodiment, the number of blankets 26 in each deployed roll 40 may be ten; in another embodiment, the number of blankets 26 in each deployed roll 40 may be 24; in yet another embodiment, the number of blankets 26 in each deployed roll 40 may be 48, each blanket 26 being six feet long in the depicted embodiment. Additionally, it is envisioned that in system 20 the longitudinally adjacent blankets 26 of each column 36 or roll 40 are spaced from each other by longitudinal gaps 74 that are approximately four to six inches wide. Thus, the column 36 length of a matrix 34 comprising 48-blanket rolls 40 will be approximately 312 feet (288 total feet in blankets 26, plus nearly 24 total feet in six inch longitudinal gaps 74 between the blankets 26).

Figure 2:
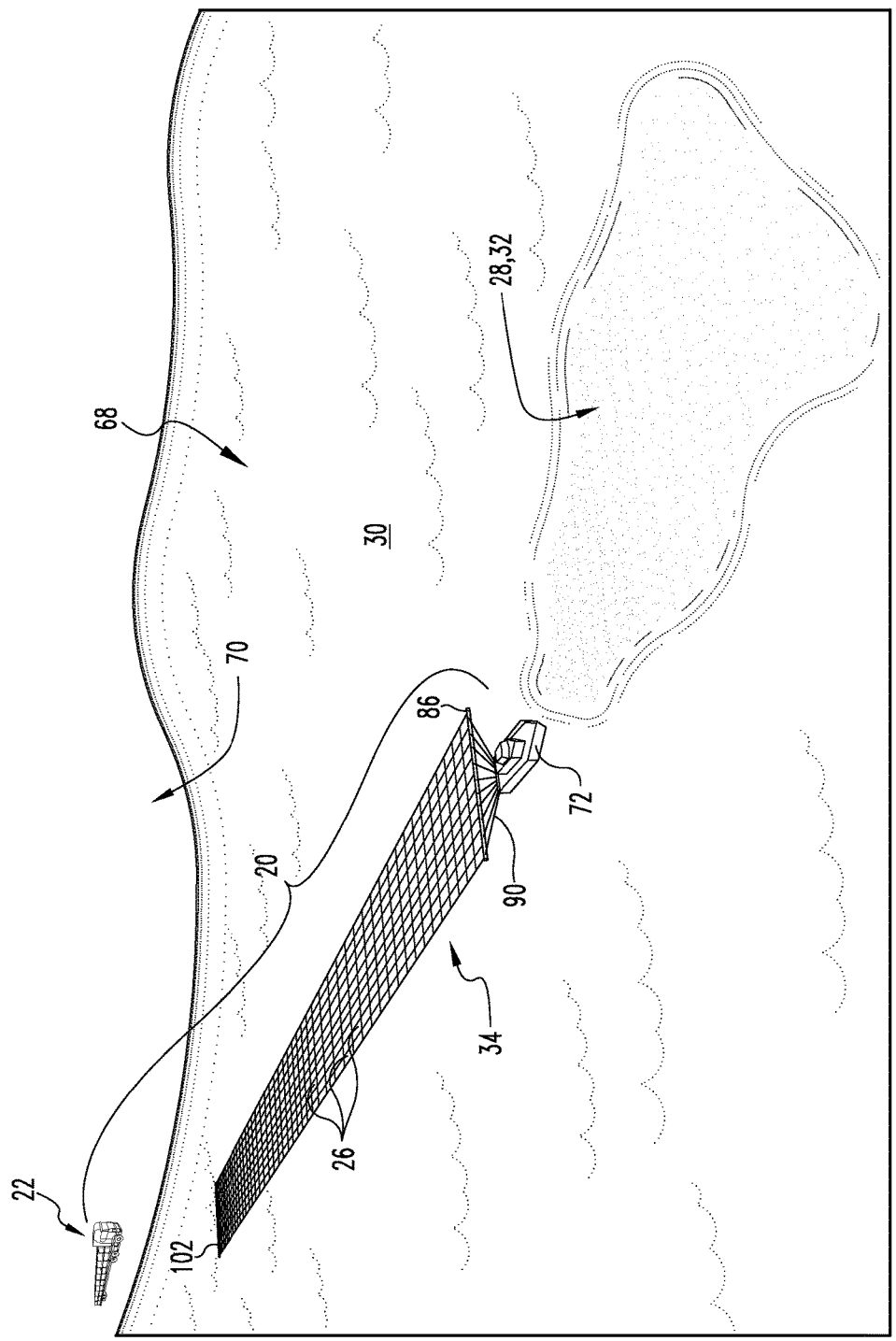
FIG. 2 is an overhead view of the deployed system of FIG. 1 approaching a spill located on the surface of a body of water.

Each row 38 of blankets 26 forming the matrix 34 is comprised of at least one blanket 26, although it is envisioned that in most applications of system 20, each row 38 will include a plurality of laterally aligned blankets 26. Referring to FIG. 2, the depicted matrix 34 includes ten columns 36 and 48 rows 38. The laterally aligned blankets 26 of adjacent columns 36 are laterally spaced from each other by a lateral gap 76 that is approximately six inches wide.

The first-dispensed blanket 56 of a roll 40 is a leading blanket 56; the last-dispensed blanket 60 of a roll 40 is a trailing blanket 60. The foremost laterally-extending edge 54 of each leading blanket 56 of a matrix 34 is attached to a substantially straight pull pole 78 that extends therealong. The pull pole 78 may be constructed of 2½ inch diameter PVC pipe having central axis 80. In a multi-column matrix 34, axes 80 of a plurality of pull poles 78 co-linear, and the plurality of coaxially aligned pull poles 78 are affixed to each other at their adjacent ends 82, as by threaded couplings 84, to form a pull pole assembly 86. Pull poles 78 thus define segments of the pull pole assembly 86.

Central to the laterally extending length of each pull pole 78 is located a through hole 88 for receiving, or a fitting 88 for attachment of, a pulling line 90. If the matrix 34 includes a single column 36, its single pull pole 78 may include a pair of pulling line holes 88 or fittings 88 at its opposite ends 82.

Figure 3:
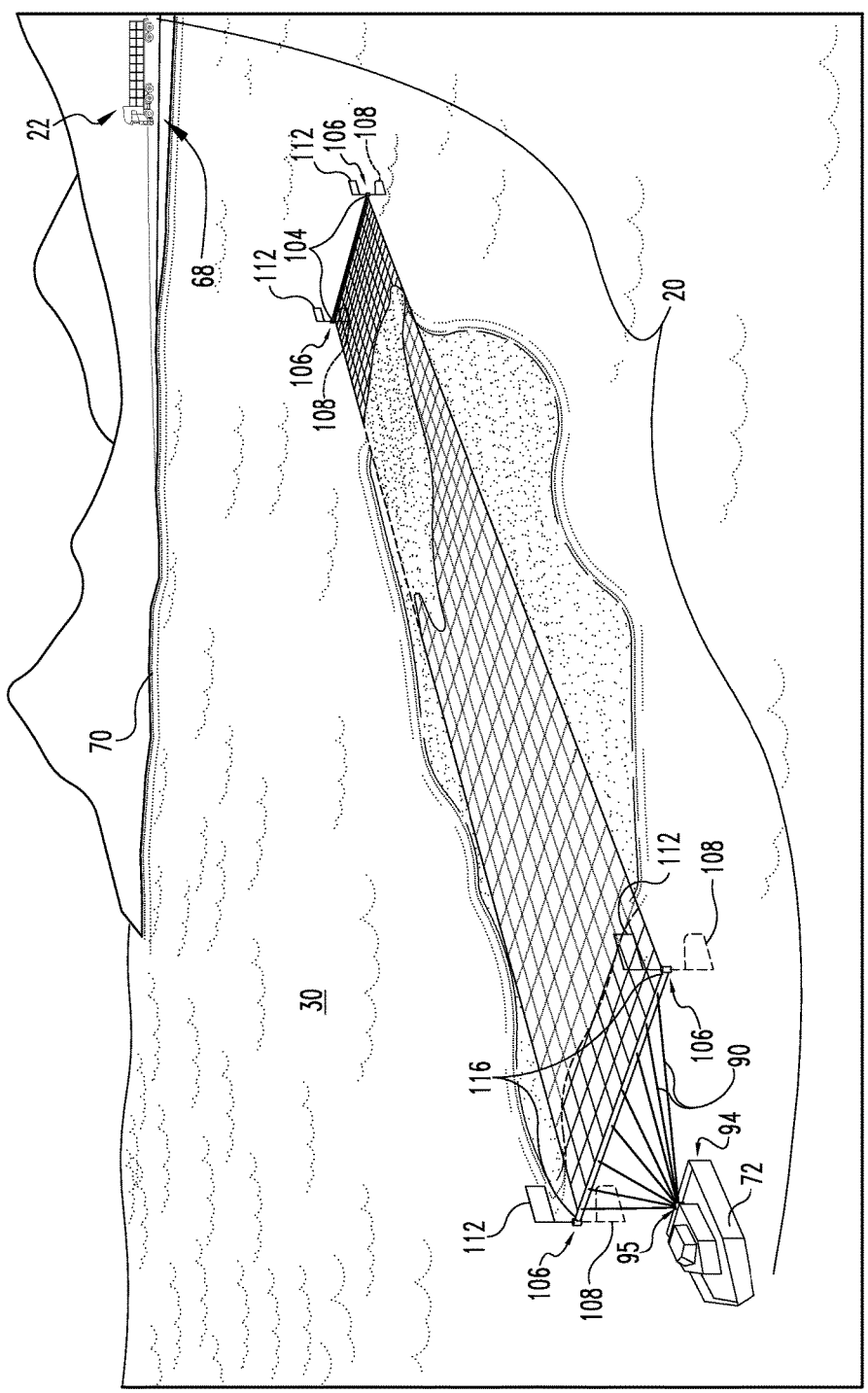
FIG. 3 is a perspective view of the deployed system of FIG. 2 being towed though the spill.

If the matrix 34 includes an odd number of columns 36, the laterally centermost pull pole 78 may omit a pulling line connection 88. The pulling lines 90 preferably extend from their respective pull pole connection 88 locations to an attachment location 92 generally laterally central of the stern 94 of the towboat 72 that pulls the matrix 34 over and through the water and in contact with the spill 32, as shown in FIGS. 2 and 3. In some embodiments, the towboat 72 comprises a portion of the system 20. The towboat 72 and the towed matrix 34 are maneuvered through the body of water 30 to bring the matrix 34 into contact with spill 32 to collect oil 28 with blankets 26 for subsequent removal of the oil from the body of water 30.

The towboat attachment location 92 may include a plurality of pulleys 95 over which freely run pulling lines 90 of different lengths, each end of a pulling line 90 attached to one of a pair of pull poles 78 that are equidistant from the lateral center of the pull pole assembly 86. Thus, the pulling line 90 segment length from the towboat attachment location 92 to its respective pull pole connection 88 location may vary during turning without introducing slack in a pulling line 90. In certain embodiments, the laterally outermost pulling line 90 segments may be wound about a capstan or windlass located at or near the towboat attachment location 92. By selectively rotating the capstan in opposite directions, these outermost pulling line 90 segments are reciprocatively lengthened and shortened to assist in turning the matrix 34 by altering the orientation of the pull pole assembly 86 relative to the towboat 72.

The aft-most laterally extending edge 58 of each trailing blanket 60 of a matrix 34 is attached to a substantially straight spool pole 96 that extends therealong. The spool pole 96 may be substantially identical to the pull pole 78, and has a central spool axis 98. In a multi-column matrix 34, a plurality to spool poles 96 are aligned along coaxial spool axis 98 and are affixed to each other at their adjacent ends 100, as by a threaded coupling 84, to form a spool pole assembly 102. Spool poles 96 thus define segments of the spool pole assembly 102.

Referring to FIG. 3, the spool pole assembly 102 may have mounted, at each of its opposing outboard ends 104, a rudder assembly 106 having electrically powered rudder 108, the position of which is controllable, for example, by radio signals. The rudder assemblies 106 help control the turning of the matrix 34 to cooperate with movement of the towboat 72 in moving the matrix 34 through the spill 32. In the embodiment shown the rudder assemblies 106 each have a rotatable mast 110 extending between and rotatably affixed to the rudder 108 and a rigid flag 112. The rudder 108 and the flag 112 both extend in a common angular direction relative to the axis 114 of the mast 110 so that an observer can judge the angular position of the rudder 108 based on the angular position of the flag 112. The rudders 108 of the two rudder assemblies 106 may be controllable in unison, or individually. The pull pole assembly 86 may also be similarly fitted with rudder assemblies 106 mounted at each of its opposing outboard ends 116, as shown in FIG. 3. In certain embodiments, improved stability of the matrix 34 during turning or straight-ahead movement is also or alternatively had by coupling sea anchors 118 to the opposite ends 104 of the spool pole assembly 102.

Figure 4:
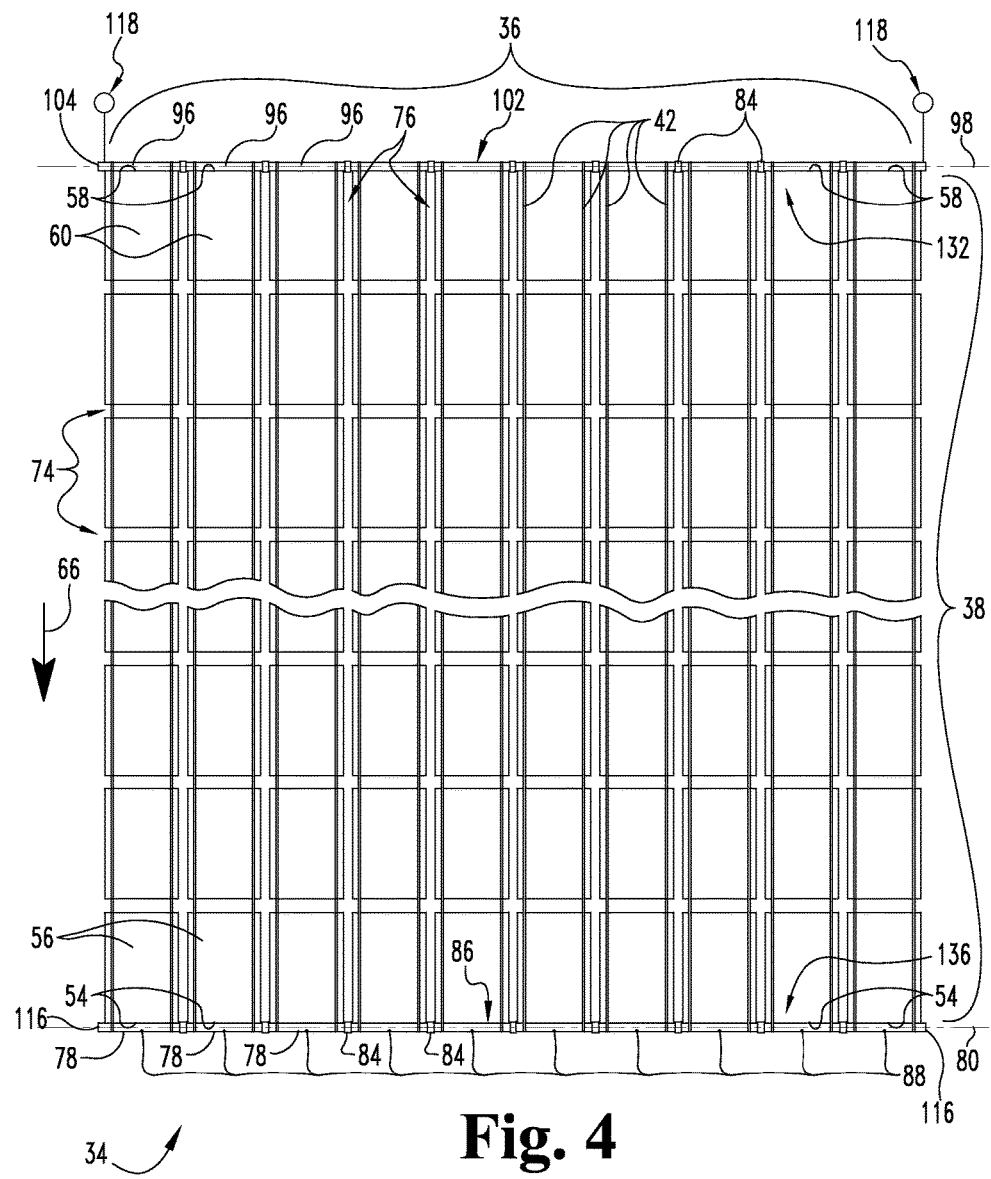
FIG. 4 is a fragmented plan view of the matrix of interconnected, oil-absorbing blankets included in the system of FIGS. 1-3.
Figure 6:
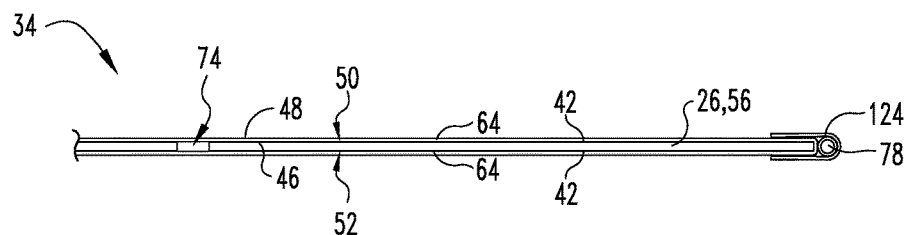
FIG. 6 is a sectional side view of the matrix of FIG. 5 along line 6-6 thereof.
Figure 5:
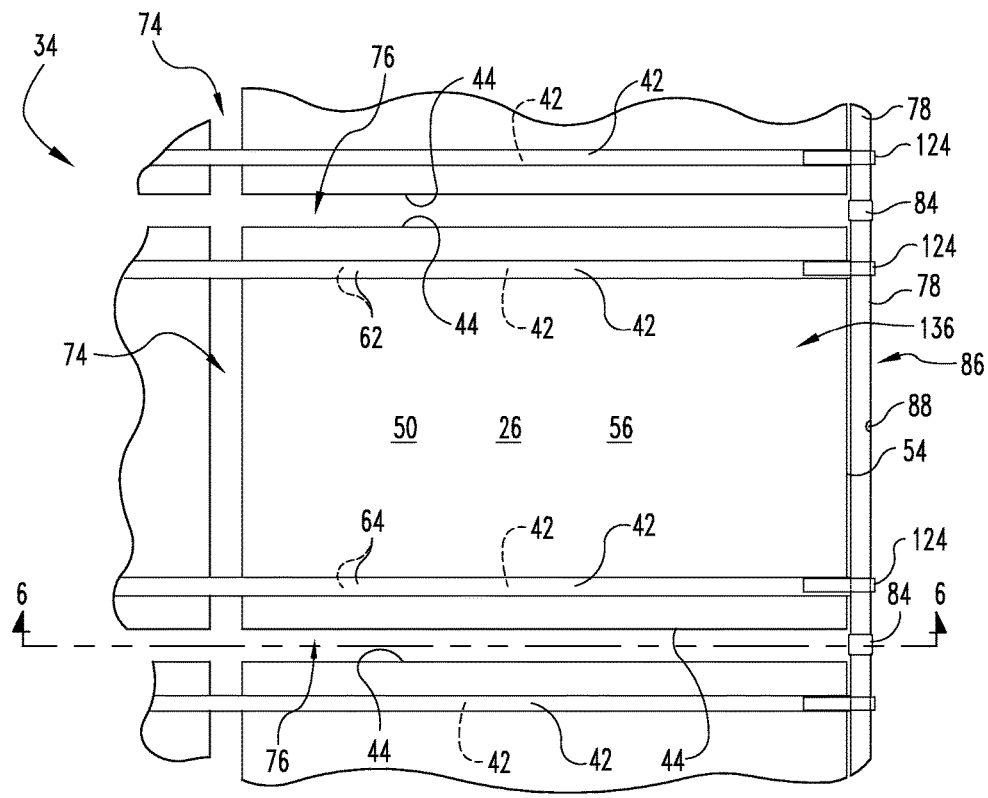
FIG. 5 is an enlarged, fragmented plant view of the matrix of FIG. 4.

FIG. 4 is a fragmented plan view of the matrix 34 showing columns 36 and rows 38, and the above-mentioned sea anchors 118 located aft of the spool pole assembly 102 to which they are attached. The above-mentioned locations of the pulling line connections 88 on the pull pole assembly 86 are also indicated. FIGS. 5 and 6 are enlarged plan and side views, respectively, of one of the blankets 26 of the matrix 34 and its pull pole assembly 86. Notably, the pull pole assembly 86 and the spool pole assembly 102 are each attached to their respective leading and trailing blanket foremost and aft-most laterally extending edges 54, 58 by cooperating, elongate strips or portions 120, 122 of hook and loop fasteners 124, such as VELCRO™. Hook and loop fastener portions 120, 122 are affixed to opposite sides 50, 52 of the leading and trailing blankets 56, 60 and to the connecting strips 42. The cooperating hook and loop fastener portions 120, 122 may each be affixed to the connecting strips 42 and/or the blanket 56, 60 material by any suitable means such as, for example, by an adhesive or by being sewn together through the superposed pairs 62, 64 of connecting strips 42 and the thickness of the blanket 56, 60.

Figure 7:
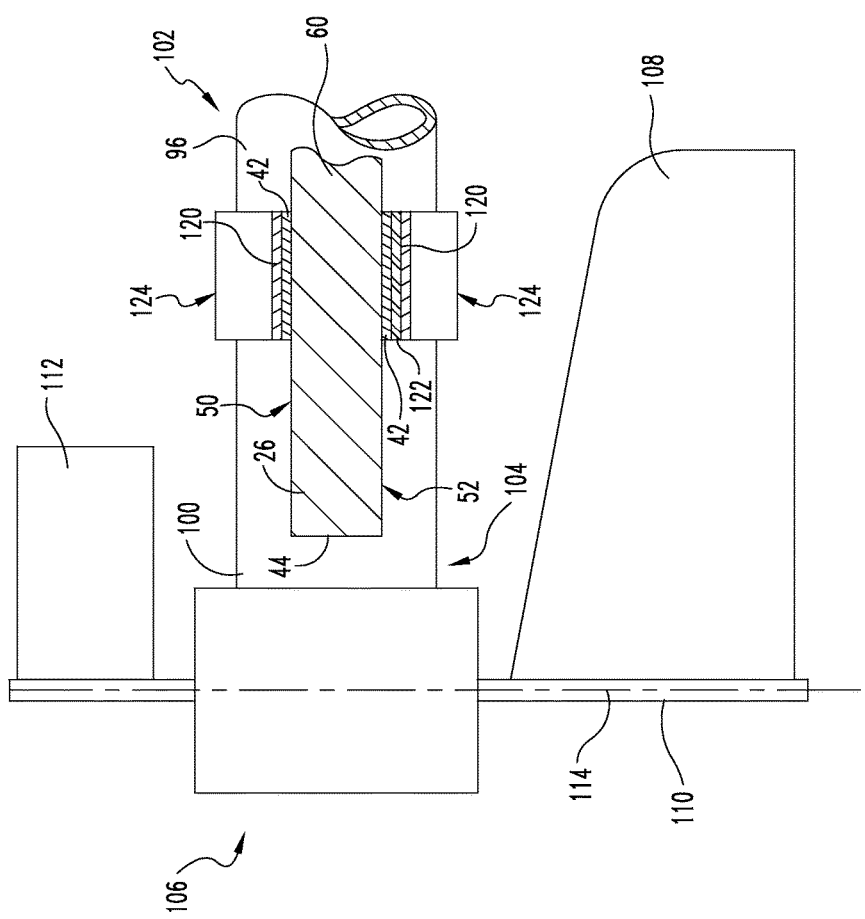
FIG. 7 is a sectional, fragmented view of an embodiment of the system including an adjustable rudder and rudder position-indicating flag.

From one side 50, 52 of first- or last-dispensed blanket 56, 60, one of the hook material portion 120 and the loop material 122 portion of each hook and loop fastener 124 extends longitudinally over the leading or trailing edge 54, 58 of each column 36. That fastener portion 120, 122 is wrapped about a pull pole 78 or spool pole 96, as the case may be, and engages its mating loop or hook material portion 120, 122 on the opposite side 50, 52 of that blanket 56, 60. Longitudinally directed forces acting between the pull or spool pole assembly 86, 102 and the connecting strips 42 are transferred through the hook and loop fasteners 124. FIG. 7 shows one end 104 of a spool pole assembly 102 outfitted with a rudder assembly 106, with the rudder 108 and the flag 112 shown extending substantially parallel with the spool pole axis 98, and a hook and loop fastener 124 having a strip of its hook material portion 120 extending about the spool pole 96.

Notably, the matrix 34 floats on the surface of the body of water 30 but can be weighted down for oil 28 removal below the surface. In another embodiment, the matrix 34 may be weighted or secured to structures (not shown) to maintain its position under the surface of the body of water 30. In one embodiment, the matrix 34 is attached to structures (not shown) with sinkers or weights (not shown) to stay submerged. Moreover, a buoy (not shown) may be attached to the weighted, submerged matrix 34 to indicate its location.

Figure 8:
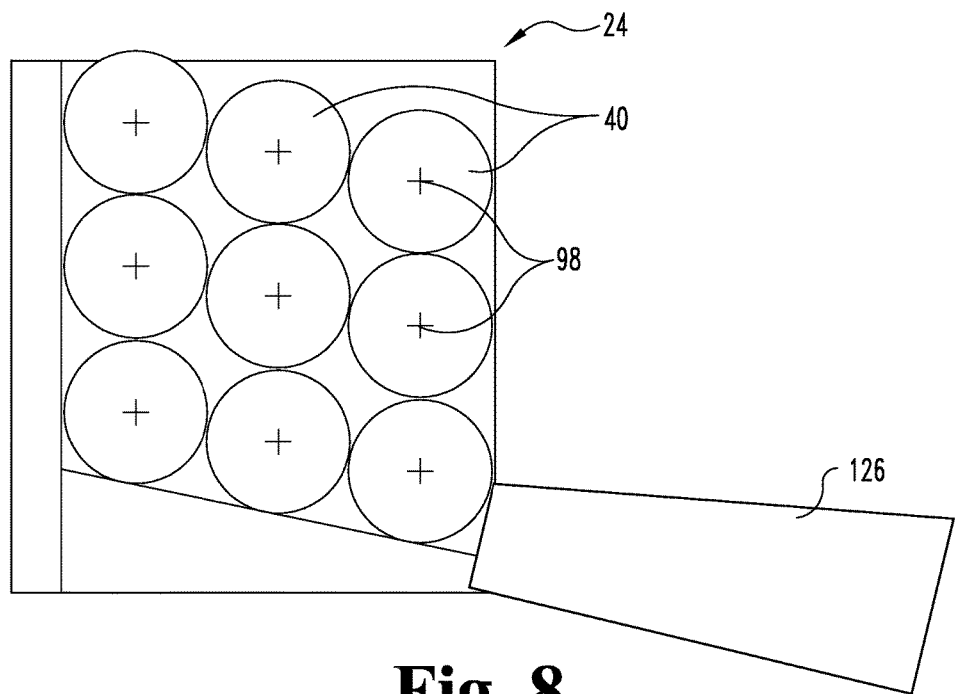
FIG. 8 is a schematic side view of an embodiment of a rack on which rolled pluralities of oil-absorbing blankets are shown stored, and from which the blankets may be dispensed during deployment of a system according to the present disclosure.
Figure 9:
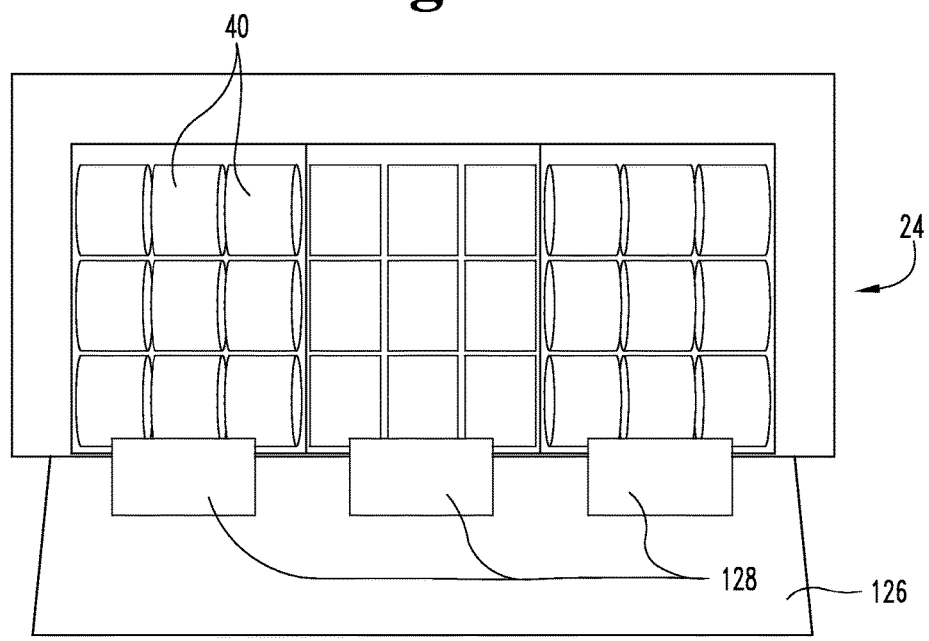
FIG. 9 is a schematic front view of the rack shown in FIG. 8.

FIGS. 8 and 9 show one embodiment of a rack 24 in which rolls 40 of oil-collecting blankets 26 are stored and from which they are dispensed from the lowest tier of the rack 24 during deployment of the system 20. In the depicted embodiment, an inflatable ramp 126 similar to an airliner's emergency egress slide is provided to facilitate easy deployment of the nine shown columns 36 or rolls 40 forming the matrix 34. Mylar sheets 128 are optionally provided to additionally smooth the roll-out of the blankets 26 as they are dispensed. In dispensing blankets 26 from the rack 24, the foremost laterally extending edges 54 of the leading blankets 56 of the nine rolls 40 are pulled onto the ramp 126 and the pull pole assembly 86 is then attached thereto with the hook and loop fasteners 124. The columns 36 are pulled in unison from laterally adjacent rolls 40 by pulling the pull pole assembly 86 down the ramp 126 and onto the body of water 30 on which the spill 32 is located. The pull pole assembly 86 is then connected to the towboat 72 via the pulling lines 90 as described above. Once the rolls 40 are pulled sufficiently to place the aft-most laterally extending edges 58 of the trailing blankets 60 of the nine rolls 40 on the ramp 126, the spool pole assembly 102 is attached thereto with the hook and loop fasteners 124. The towboat 72 then continues towards and through the spill 32, dragging the matrix 34 behind it and into contact with the spill 32, as shown in FIGS. 2 and 3.

Figure 10:
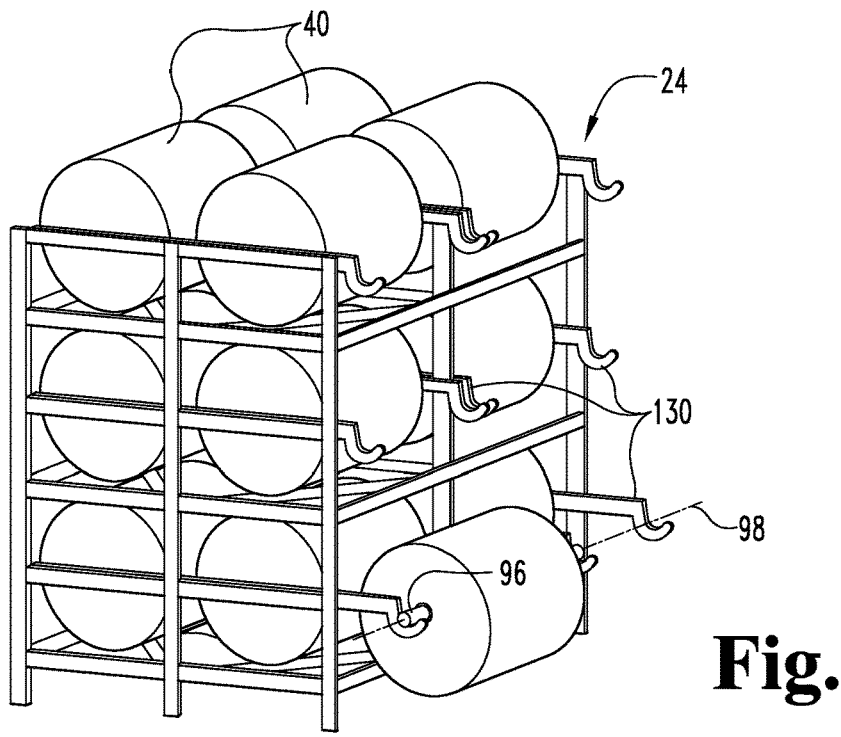
FIG. 10 is a perspective view of another embodiment of a rack on which rolled pluralities of oil-absorbing blankets are shown stored, and from which the blankets may be dispensed during deployment of a system according to the present disclosure.
Figure 11:
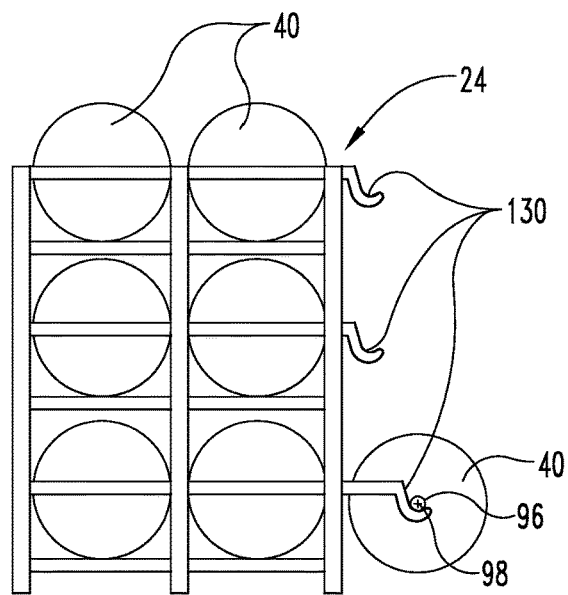
FIG. 11 is a side view of the rack shown in FIG. 10.

FIGS. 10 and 11 show another embodiment of a rack 24 in which rolls 40 of oil-collecting blankets 26 are stored, and from which they are dispensed from the lowest tier of the rack 24. In FIGS. 10 and 11 only one of the rolls 40 to be deployed is shown supported by its respective spool pole 96. In the depicted embodiment, the rolls 40 to be deployed are supported by the spool pole assembly 102, which is itself supported on hooks 130 that extend from the bottommost tier of the rack 24. Dispensing of the blankets 26 of the spirally wound column(s) 36 defining roll(s) 40 during matrix deployment thus entails unrolling the column(s) from about spool axis 98, which is supported by rack 24 through its hooks 130 which extend from the bottommost rack tier. The aft-most laterally extending edges 58 of the trailing blankets 60 of the rolls 40 to be deployed are attached to their respective spool poles 96 with the hook and loop fasteners 124, and the adjacent ends 100 of the spool poles 96 are interconnected to form the spool pole assembly 102 while the rolls 40 and spool poles 96 are supported in the hooks 130.

In deploying the matrix 34 from the rack 24 of FIGS. 10 and 11, the foremost laterally extending edges 54 of the leading blankets 56 of the rolls 40 are pulled out slightly and aligned with each other, and the pull pole assembly 86 is attached thereto with the hook and loop fasteners 124. The rolls 40 are pulled in unison by pulling the pull pole assembly 86 onto the body of water 30 on which the spill 32 is located and connecting it to the towboat 72 via the pulling lines 90 as described above. Once the blankets 26 are substantially unrolled, the spool pole assembly 102 is lifted from the hooks 130 of the rack 24 and the trailing end 132 of the matrix 34 is pulled onto the water. The towboat 72 then continues towards and through the spill 32, pulling the matrix 34 behind it and into contact with the spill 32, as shown in FIGS. 2 and 3.

FIGS. 12-15 show another embodiment of a rack 24 on which rolls 40 of blankets 26 may be stored and from which they may be deployed. In this embodiment, the opposite ends 82 of the spool pole 96, of a roll 40 disposed in a compartment of rack 24, are received in and supported by a laterally opposed pair of substantially horizontally-extending channels provided in each rack compartment. In this embodiment, dispensing of the blankets 26 of the spirally wound column(s) 36 defining roll(s) 40 during matrix deployment entails unrolling the column(s) from about spool axis 98 which is supported by rack 24

Figure 16:
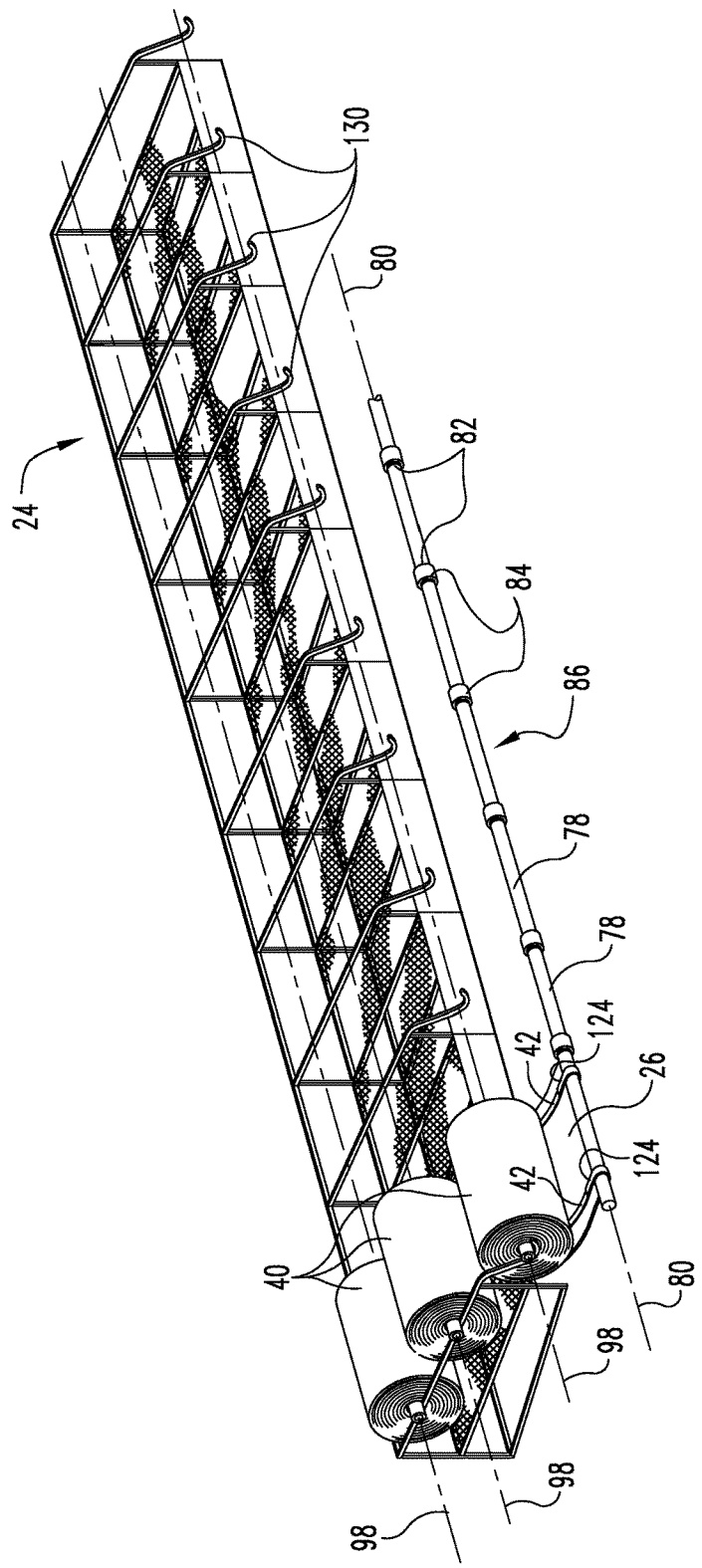
FIG. 16 is a perspective view of another embodiment of a rack on which rolled pluralities of oil-absorbing blankets may be stored, and from which the blankets may be dispensed during deployment of a system according to the present disclosure, showing a plurality of rolled blankets stored in only one of its multiple bays and a fragmented view of a leader pole.
Figure 17:
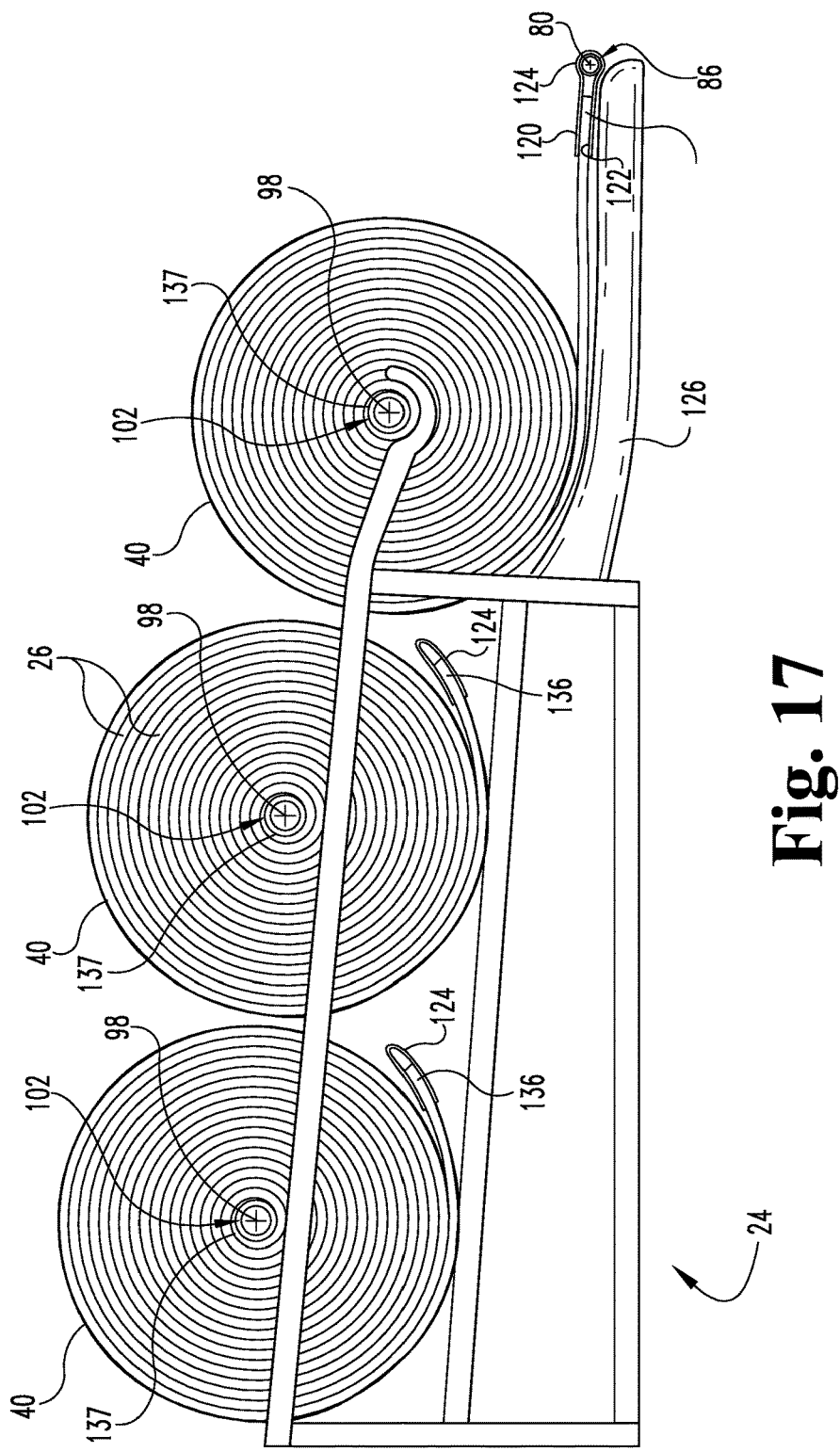
FIG. 17 is a side view of the rack and stored rolls of blankets shown in FIG. 16.

FIGS. 16 and 17 show another embodiment of a rack 24 on which rolls 40 of blankets 26 may be stored and from which they may be deployed. In the rack 24 of FIGS. 16 and 17, the laterally adjacent rolls 40 of separate matrices 34 may be interconnected via their respective spool pole assemblies 102 while stored on rack 24. Dispensing of the blankets 26 of the spirally wound column(s) 36 defining roll(s) 40 during matrix deployment entails unrolling the column(s) from about spool axis 98, which is supported by the rack 24 through its hooks 130. In this embodiment, an inflatable ramp 126 similar to an airliner's emergency egress slide is provided to facilitate easy deployment of up to ten columns 36 or rolls 40 forming each matrix 34. In deploying each matrix 34 from the rack 24, the foremost laterally extending edges 54 of the leading blankets 56 of the laterally adjacent rolls 40 are pulled onto the ramp 126 and the pull pole assembly 86 is attached thereto with the hook and loop fasteners 124. The rolls 40 are pulled in unison by pulling the pull pole assembly 86 down the ramp and onto the body of water 30 on which the spill 32 is located. The pull pole assembly 86 is then connected to the towboat 72 via the pulling lines 90 as described above. Once the blankets 26 are substantially unrolled, the spool pole assembly 102 is lifted from the hooks 130 of the rack 24 and the trailing end 132 of the matrix 34 is pulled onto the water. The towboat 72 then continues towards and through the spill 32, pulling the matrix 34 behind it and into contact with the spill 32, as shown in FIGS. 2 and 3.

Figure 18:
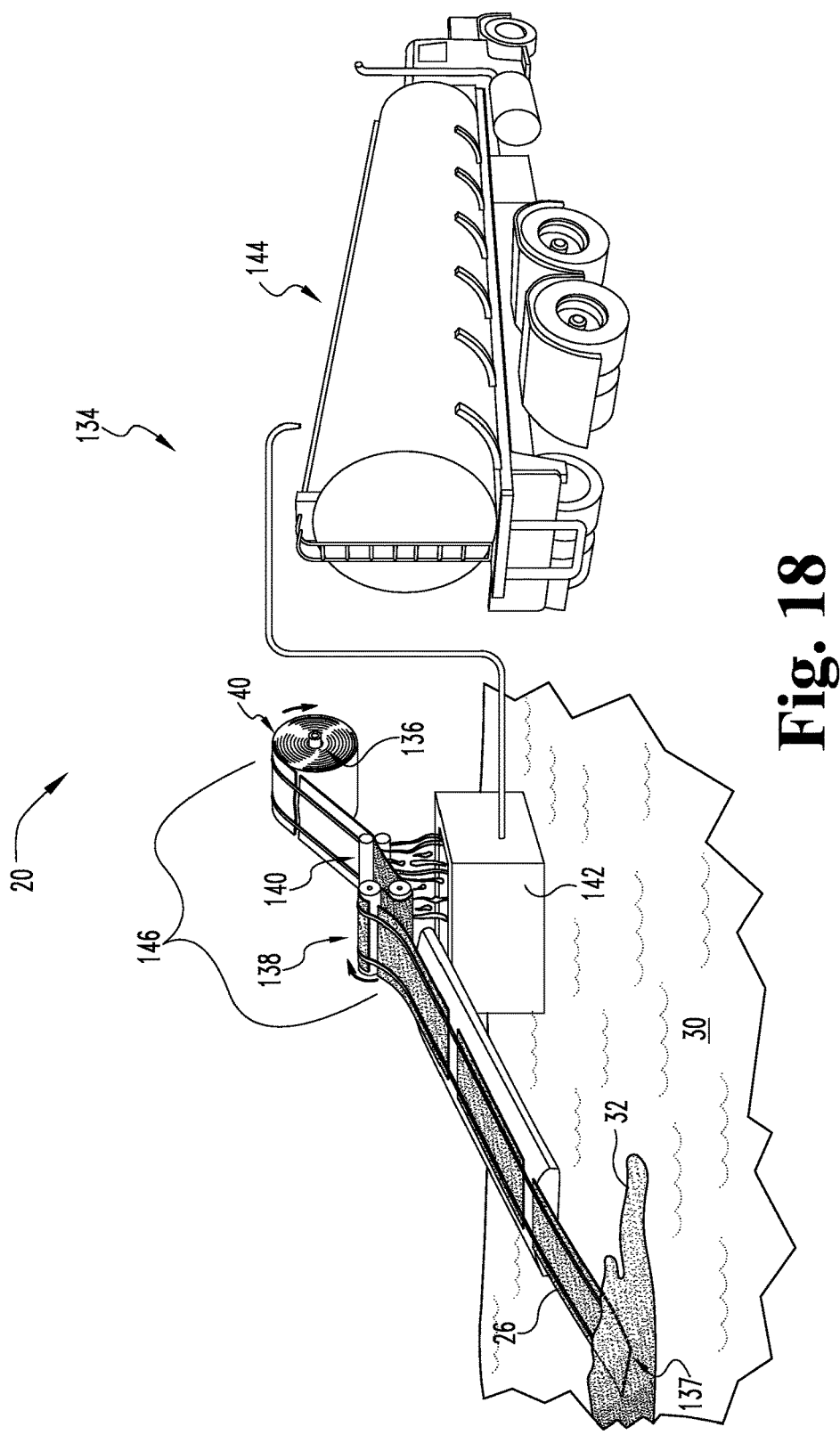
FIG. 18 is a schematic, perspective view of an embodiment of an optional oil-recovery portion of a system according to the present disclosure.
Figure 19:
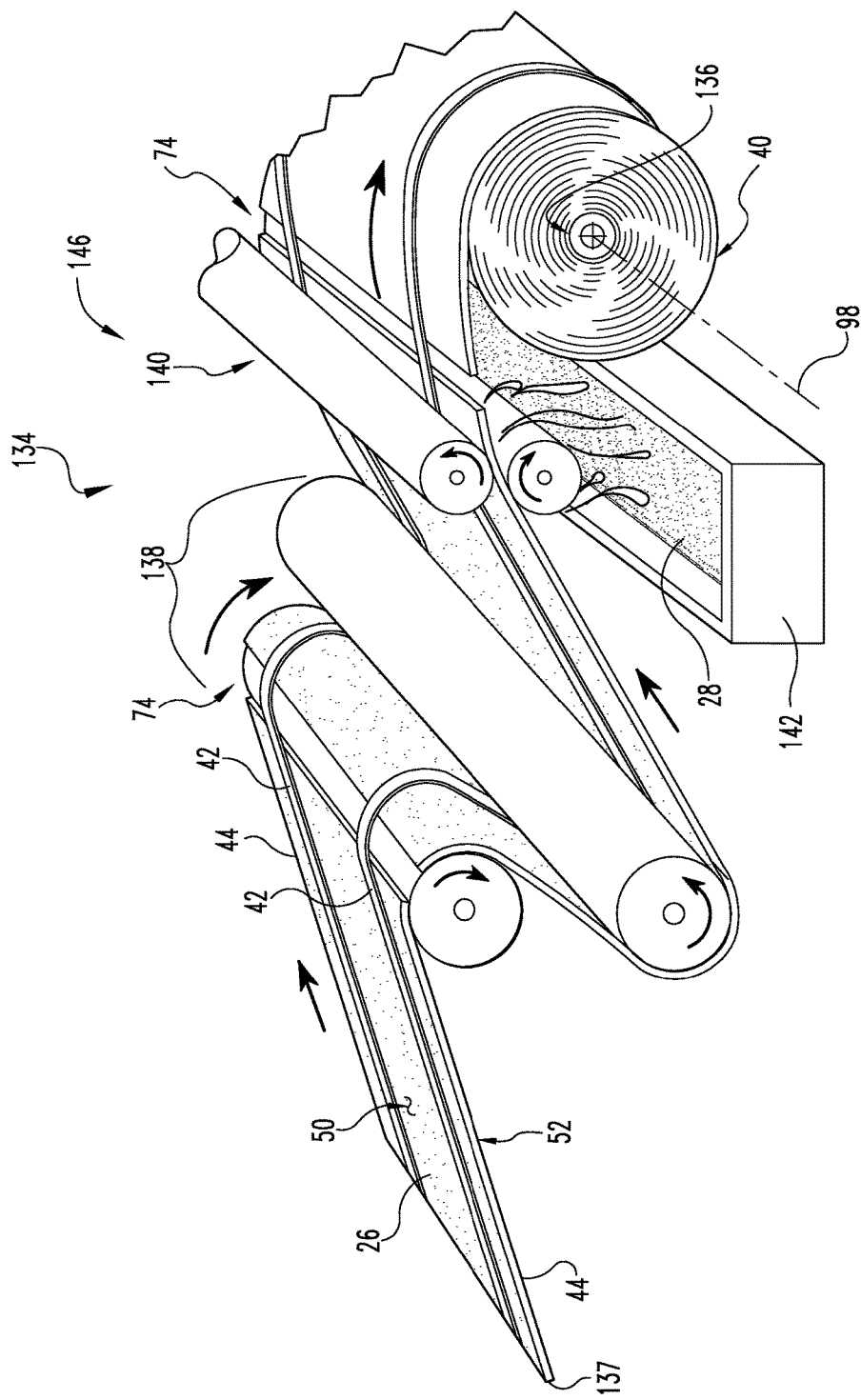
FIG. 19 is a fragmented, perspective view of a wringer embodiment that may be utilized in the oil-recovery portion shown in FIG. 18.
Figure 20:
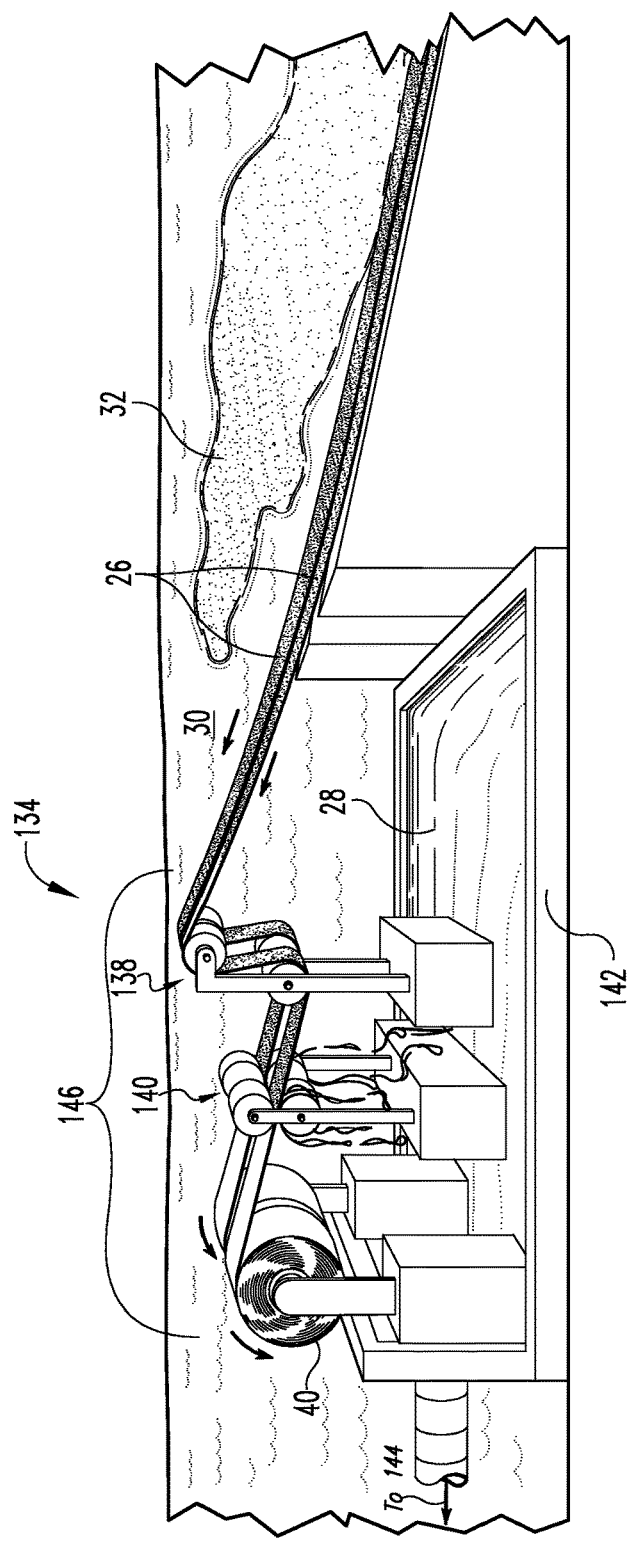
FIG. 20 is a perspective view of another wringer embodiment that may be utilized in the oil-recovery portion shown in FIG. 18.

FIGS. 18-20 depict an oil recovery portion 134 of certain embodiments of a system 20 according to the present disclosure. Generally, the oil recovery process is performed with use of OPFLEX™ media which, compared to white board, is better suited for recovery or reclamation of the removed oil, as discussed above. Referring to FIG. 18, the pull pole assembly 86 and/or the spool pole assembly 102 is removed from the matrix 34, and the leading end 136 or the trailing end 137 of a column 36 containing oil 28 removed from the body of water 30 is drawn over a pair of rotating drive rollers 138 and between an opposing pair of wringer rollers 140 that compress blankets 26 and squeeze the oil from the blankets 26 of the column 36. Downstream of the wringer rollers 140, the interconnected blankets 26 are continually pulled onto a spool pole 96, which forms a new roll 40 of used blankets 26 from which the removed oil has been recovered. The oil squeezed from the rollers 138, 140 is collected by gravity into a collection container 142, and pumped into a suitable conveyance 144 such as a tanker truck. It is to be understood that the conveyance 144 need not be a land-based vehicle as shown in FIG. 18. It may instead be, for example, a train car, barge, ship, or another suitable vehicle useful for transporting the oil recovered from the collecting blankets 26 from the recovery process location. It is to also be understood that the conveyance 144 need not be a vehicle at all. It may instead be, for example, a pipeline or other fixed means for transporting the recovered oil. It is to also be understood that the conveyance 144 itself may be an optional part of a system 20 according to the present disclosure.

As best seen in FIG. 19, the connecting strips 42 carry the tensile loads associated with drawing the interconnected blankets 26 through the oil recovery process and into the newly formed roll 40. Further, the longitudinal gaps 74 located between longitudinally adjacent blankets 26 allow oil squeezed from each blanket 26 to drain into the collection container 142 without flowing onto the following blanket 26, which would impede the efficiency of the oil recovery process. FIG. 20 shows an oil recovery portion 134 of an embodiment of the system 20 comprising two parallel wringing and rolling stations 146 that can operate simultaneously to more quickly recover the oil removed from the spill 32 and roll the blankets 26 of each matrix column 36, now bereft of the oil recovered therefrom, for subsequent redeployment. A large collection container 142 is provided beneath both stations 146, from which recovered oil is pumped to a suitable conveyance 144 such as the tanker truck of FIG. 18.

Figure 21:
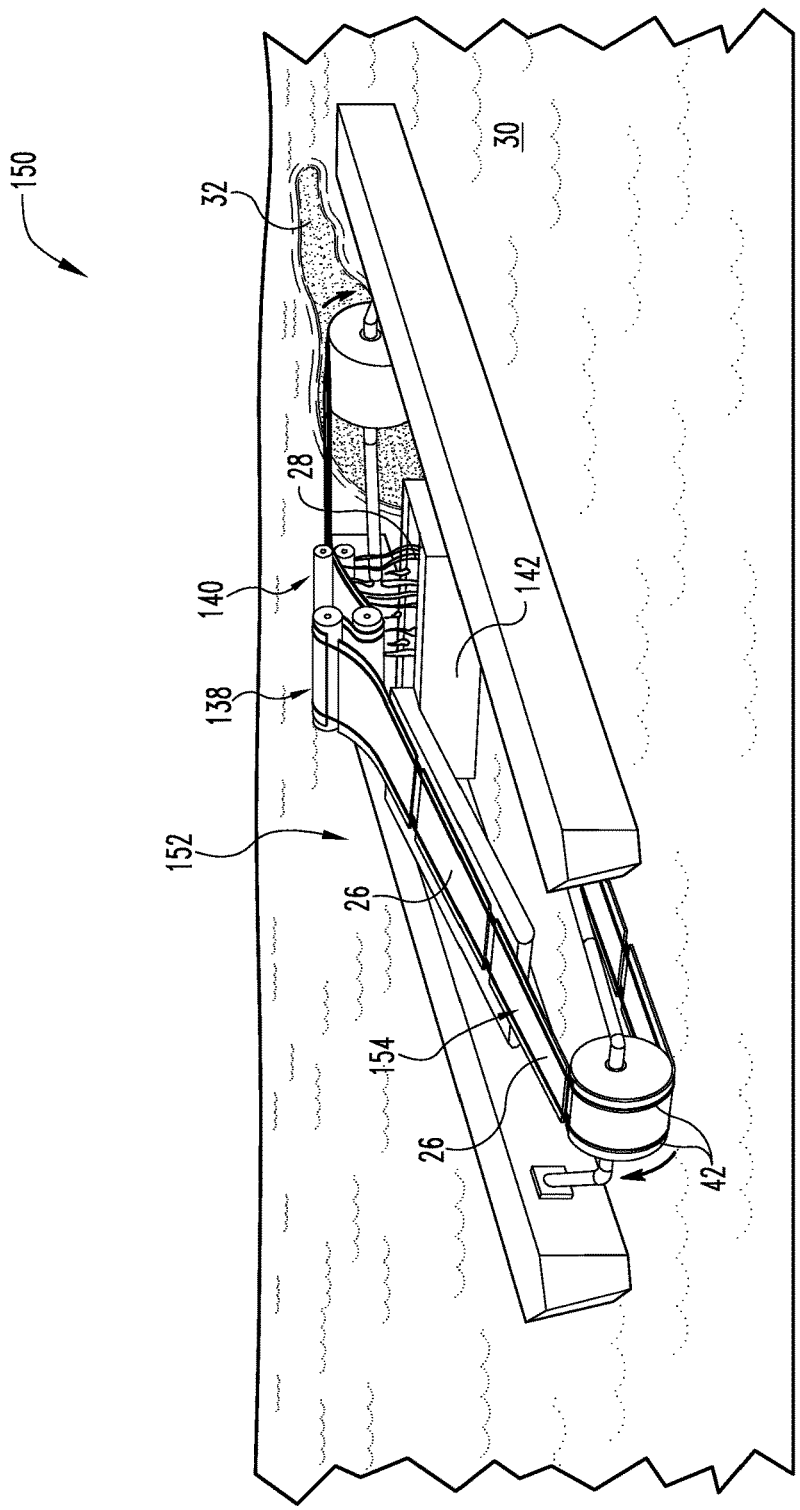
FIG. 21 is a perspective view of another embodiment of a system according to the present disclosure including a skimmer boat for removal and recovery of oil from a spill which may be distant or inconveniently accessed from land.

FIG. 21 depicts a spill removal and recovery system 150 comprising a skimmer boat 152 that carries a matrix in the form of a continuously moveable, endless belt 154 defined by a column of oil-collecting blankets 26 interconnected by longitudinally extending connecting strips 42. The skimmer boat 152 and the continuously moving matrix 154 are maneuvered through the body of water 30 to bring the matrix into contact with spill 32 to collect oil 28 with blankets 26 for subsequent removal of the oil from the body of water 30. Portions of the belt 154 containing oil 28 collected by blankets 26 are removed from the body of water 30 and subjected to an oil recovery process utilizing rollers which compress the endless belt 154 and in which oil 28 collected by the continuously moving blankets 26 is squeezed therefrom, after which those blankets 26 are immediately redeployed to the body of water 30 as the endless belt 154 continues its longitudinal movement. The endless belt 154 of blankets 26 is constructed substantially similarly to the longitudinally aligned, interconnected blankets 26 of the above-described columns 36 except that the leading and trailing ends 136, 137 of the matrix column defining endless belt 154 are interconnected to each other with connecting strips 42, and the blankets 26 of endless belt 154 are not spirally wound or spooled into a roll 40 prior to or after their deployment.

As in system 20, in system 150 resistance to movement of the endless belt 154 in a longitudinal direction of its travel through the body of water, or drag, attributed to a pulled, relatively following or aft-located blanket 26 of a endless belt 154 resulting, for example, from that blanket's contact with the body of water, is not imparted to a relatively leading or fore-located blanket 26 of the endless belt 154 that is itself being pulled, as pulling forces applied to both blankets as they move in unison are carried by the tensioned connecting strips 42. In other words, in the direction of endless belt travel, the drag on a following, aft-located blanket 26 of the matrix 154, such as may be induced by that blanket's resistance to movement through the body of water 30, is not carried by a preceding, fore-located blanket 26 but rather by the connecting strips 42. Consequently, stresses on the preceding blanket 26 of the endless belt 154 due to that drag are avoided, thereby beneficially reducing the risk of its damage, e.g., by being torn, and possibly prolonging its service life.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for removing oil from a body of water, comprising the steps of:
    providing a plurality of columns of oil-absorbing and/or oil-adsorbing bodies of open cell foam wherein each column of the plurality of columns includes first and second foam bodies arranged to form the column and affixed independently of each other to a pair of connecting strips extending along the length of the column, the pair of connecting strips being located between opposite lateral edges of the first and second foam bodies and disposed proximate opposite edges of each of the first and second foam bodies and wherein each one of the pair of elongate connecting strips comprises a strip of material on each side of the foam bodies, the strips of material being attached together through the foam bodies;
    deploying the plurality of columns to a body of water to bring the plurality of columns into contact with the body of water;
    inducing tension in the connecting strips to move the first and second foam bodies of each of the plurality of columns in a column longitudinal direction relative to the body of water;
    moving the plurality of columns relative to the body of water with a boat;
    maneuvering the plurality of columns through the body of water to bring the plurality of columns into contact with an oil spill located on the body of water;
    collecting oil from the oil spill contained in the body of water with the first and second foam bodies of each of the plurality of columns and wherein the plurality of columns define a lateral gap between adjacent columns during the step of collecting; and
    removing the first and second foam bodies of each of the plurality of columns and at least a portion of the oil collected thereby from the body of water, whereby oil is removed from the body of water.

2. The method of claim 1, comprising a step of recovering from the first and second foam bodies of each of the plurality of columns oil removed from the body of water; and
    wherein the first and second foam bodies of each of the plurality of columns are separated by a longitudinal gap.

3. The method of claim 2, comprising a step of bringing the first and second foam bodies of each of the plurality of columns into contact with the body of water subsequent to the step of recovering.

4. A method for removing oil from a body of water, comprising the steps of:
    providing a plurality of columns of oil-absorbing and/or oil-adsorbing bodies of open cell foam wherein each column of the plurality of columns includes first and second foam bodies arranged to form the column and affixed independently of each other to a pair of connecting strips extending along the length of the column, the pair of connecting strips being located between opposite lateral edges of the first and second foam bodies and disposed proximate opposite edges of each of the first and second foam bodies and wherein each one of the pair of elongate connecting strips comprises a strip of material on each side of the foam bodies, the strips of material being attached together through the foam bodies;
    deploying the plurality of columns to a body of water to bring the plurality of columns into contact with the body of water;
    inducing tension in the connecting strips to move the first and second foam bodies of each of the plurality of columns in a column longitudinal direction relative to the body of water;
    collecting oil contained in the body of water with the first and second foam bodies of each of the plurality of columns wherein the plurality of columns define a lateral gap between adjacent columns during the step of collecting;
    removing the first and second foam bodies of each of the plurality of columns and at least a portion of the oil collected thereby from the body of water, whereby oil is removed from the body of water; and
    wherein the plurality of columns are positioned on a rack and the step of deploying includes dispensing a first one of the plurality of columns longitudinally from the rack by applying tension to the connecting strips of the first one of the plurality of columns.

5. The method of claim 4, wherein the dispensing includes unrolling the first one of the plurality of columns from about an axis supported by the rack.

6. The method of claim 4, comprising steps of:
    moving the plurality of columns relative to the body of water with a boat; and maneuvering the plurality of columns through the body of water to bring the plurality of columns into contact with an oil spill located on the body of water;

wherein the step of collecting includes collecting oil from the oil spill with the first and second foam bodies of each of the plurality of columns.

7. The method of claim 1, wherein the step of moving includes towing the plurality of columns in a substantially longitudinal direction with the boat.

8. The method of claim 7, wherein the step of maneuvering includes utilizing at least one of an adjustable rudder and a sea anchor to control movement of the plurality of columns relative to the body of water and the boat.

9. The method of claim 6, wherein each of the plurality of columns is in the form of a continuously moveable endless belt carried by the boat.

\* \* \* \* \*